United States Patent
Fuhr et al.

(10) Patent No.: US 9,024,755 B2
(45) Date of Patent: *May 5, 2015

(54) STOCK ANALYTIC MONITORING

(71) Applicant: Target Brands, Inc., Minneapolis, MN (US)

(72) Inventors: Jaclyn Fuhr, Richfield, MN (US); Andrew Ascher, Plymouth, MN (US)

(73) Assignee: Target Brands, Inc., Minneapolis, MN (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/657,411

(22) Filed: Oct. 22, 2012

(65) Prior Publication Data

US 2013/0039543 A1 Feb. 14, 2013

Related U.S. Application Data

(62) Division of application No. 12/614,029, filed on Nov. 6, 2009, now Pat. No. 8,325,036.

(60) Provisional application No. 61/111,914, filed on Nov. 6, 2008.

(51) Int. Cl.
*G08B 21/00* (2006.01)
*G06Q 10/08* (2012.01)
(Continued)

(52) U.S. Cl.
CPC ........ *G06Q 10/087* (2013.01); *G08B 13/19613* (2013.01); *G08B 25/14* (2013.01); *G08B 27/00* (2013.01)

(58) Field of Classification Search
CPC ............................ G06Q 10/087; G06K 7/0008
USPC ........................ 340/540, 5.92; 705/14, 22, 28
See application file for complete search history.

(56) References Cited

U.S. PATENT DOCUMENTS

| | | | |
|---|---|---|---|
| 5,036,467 A | 7/1991 | Blackburn et al. | |
| 5,091,713 A | 2/1992 | Horne et al. | |

(Continued)

FOREIGN PATENT DOCUMENTS

JP CN101464418 6/2009

OTHER PUBLICATIONS

Senior, A.W., Brown, L., Hampapur, A., Shu, C. et al. "Video Analytics for Retail", IBM T.J. Watson Research Center, published in 2007, 6 pages.

(Continued)

*Primary Examiner* — John A Tweel, Jr.
(74) *Attorney, Agent, or Firm* — Merek, Blackmon & Voorhees, LLC

(57) ABSTRACT

In selected embodiments video footage is automatically analyzed to determine whether product stock levels at particular product locations are low. Video analytics may be employed to track product removal from shelves and determine approximate quantities of product remaining on each shelf based on product size and dedicated shelf area. In selected implementations an alarm notification is generated to alert store personnel that restocking is appropriate. Such an alarm notification optionally includes a still image of the area corresponding to the alarm together with data related to the product and projected quantities needed to restock the shelf. In some embodiments the system automatically identifies the store personnel who are currently located in areas near where the alarm event occurred and the notification is wirelessly distributed to their mobile devices.

20 Claims, 8 Drawing Sheets

(51) Int. Cl.
*G08B 13/196* (2006.01)
*G08B 25/14* (2006.01)
*G08B 27/00* (2006.01)

(56) References Cited

U.S. PATENT DOCUMENTS

| | | | |
|---|---|---|---|
| 6,144,379 | A | 11/2000 | Bertram et al. |
| 6,424,370 | B1 | 7/2002 | Courtney |
| 6,704,012 | B1 | 3/2004 | Lefave |
| 6,909,356 | B2 | 6/2005 | Brown et al. |
| 6,952,679 | B1 | 10/2005 | Pulford |
| 7,184,857 | B1 | 2/2007 | Hertz et al. |
| 7,567,262 | B1 | 7/2009 | Clemens et al. |
| 2002/0072988 | A1 | 6/2002 | Aram |
| 2002/0138336 | A1* | 9/2002 | Bakes et al. ........... 705/10 |
| 2003/0216969 | A1* | 11/2003 | Bauer et al. ........... 705/22 |
| 2004/0068455 | A1* | 4/2004 | Jacobus et al. ........ 705/36 |
| 2005/0086133 | A1* | 4/2005 | Scherer et al. ........ 705/28 |
| 2006/0190960 | A1 | 8/2006 | Barker |
| 2006/0192675 | A1 | 8/2006 | Renkis |
| 2008/0018738 | A1 | 1/2008 | Lipton et al. |
| 2008/0074496 | A1 | 3/2008 | Venetianer et al. |
| 2008/0163041 | A1 | 7/2008 | Delargy |
| 2008/0195928 | A1 | 8/2008 | Matsa et al. |
| 2008/0249858 | A1 | 10/2008 | Angell et al. |
| 2009/0024911 | A1 | 1/2009 | Margolis |
| 2009/0063307 | A1* | 3/2009 | Groenovelt et al. ........... 705/28 |

OTHER PUBLICATIONS

Grimm, Jacqueline, "Remote Video Monitoring", Diebold, Inc. 2008, 5 pages.
"Overseas Merchandise Trade: Feb. 2009 Commentary", Statistics New Zealand, Feb. 2009.
Google Finance, Target Corporation Stock Hourly [Online], Oct. 5, 2009, Retrieved Oct. 5, 2009 from http://www.google.com/finance?q=target.
Google Finance, Target Corporation Target Stock Daily [Online], Oct. 5, 2009 Retrieved Oct. 5, 2009 from http://www.google.com/finance?q=targ.

* cited by examiner

STOCK ANALYTIC MONITORING

CROSS-REFERENCE TO RELATED APPLICATION

This Application is a divisional of and claims priority to U.S. patent application Ser. No. 12/614,029 filed on Nov. 6, 2009 which claims priority under 35 U.S.C. §119 (e) to U.S. Provisional Application Ser. No. 61/111,914, filed on Nov. 6, 2008, and entitled, "In Stock Analytic Monitoring Method and Apparatus" and incorporates those applications herein by reference in their entirety.

BACKGROUND

Many customers who visit a retail store, such as a grocery store, a department store, or a consumer electronics store, have an expectation that if the store carries an item it will be available and on a shelf for purchase. When an item is not on the shelf or otherwise at an expected location, a customer may have difficulty purchasing the item.

Many stores do not put all available inventory on the shelves for display. Instead, stores often utilize a stock room to store certain portions of the inventory, sometimes in bulk packaging. For example, a grocery store might have fifty boxes of a particular cereal, which may have been purchased and shipped in a single bulk package. The shelf location for that particular variety of cereal may only be large enough to hold ten boxes at any given time, so the remainder may be kept in the stock room. When some or all of the ten boxes are purchased by customers, the store may replenish the number of boxes available on the shelf, such as by having a stock room employee bring additional boxes out from the stock room, and placing them on the shelf.

Video monitoring systems may be used to monitor retail locations for various purposes. In particular, video monitoring systems may be used to monitor different locations within the interiors of a retail store, such as high-traffic aisles, security-sensitive areas, and the like. Video monitoring systems may also be used to monitor locations at the exteriors of a retail store, such as parking lots, loading docks, external doors, etc.

The video from a video monitoring system is sometimes monitored in real-time by store personnel to ensure that nothing out of the ordinary is occurring in the monitored locations. For example, the video of a high-traffic aisle in a retail store may be monitored in real-time and if a spill or some other accident occurs the person monitoring the video might ask a store associate to go to the location to help with the accident. The captured video from a video monitoring system can also be stored, for example in a video archive, for later viewing and analysis. Stored video may allow store personnel to study a situation that has occurred in the past, for example, to determine the cause of a particularly interesting situation or to determine how the situation was remedied.

SUMMARY

In selected embodiments video footage is automatically analyzed to determine whether product stock levels at particular product locations are low. Video analytics may be employed to track product removal from shelves and determine approximate quantities of product remaining on each shelf based on product size and dedicated shelf area. In selected implementations an alarm notification is generated to alert store personnel that restocking is appropriate. Such an alarm notification optionally includes a still image of the area corresponding to the alarm together with data related to the product and projected quantities needed to restock the shelf. In some embodiments, the system automatically identifies the store personnel who are currently located in areas near where the alarm event occurred and the notification is wirelessly distributed to their mobile devices.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE IMPLEMENTATIONS

Figure 1:
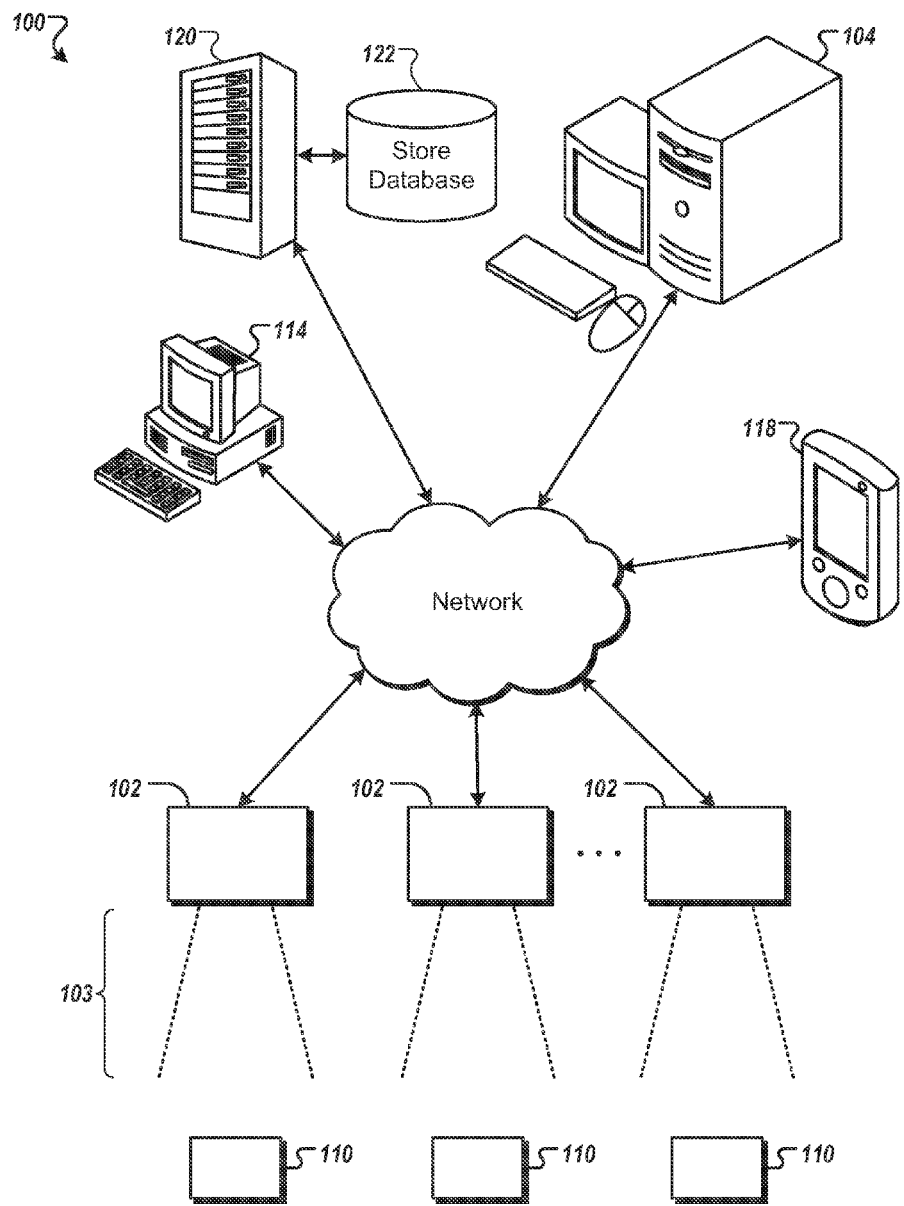
FIG. 1 is a conceptual diagram of a representative video monitoring system.

FIG. 1 is a conceptual diagram of a representative video monitoring system 100 of a facility, such as a retail store, according to one implementation. The video monitoring system 100 includes multiple video monitoring devices 102, such as analog or digital video cameras that are spread throughout the facility. The video monitoring devices 102 are configured to capture video information of a particular area 110 of the facility and to store the video information either locally (e.g., on internal memory of the individual monitoring devices) or in a central location, such as on a controller 104. Such a video monitoring system 100 is used for a number of different purposes in a retail environment, including, for example, video capture (e.g., recording video and storing it for later use) and video surveillance (e.g., monitoring of live video).

In some implementations the video monitoring system 100 is used for automatically analyzing events occurring in a particular portion of video, either in real-time or from video that has previously been captured and stored. This process of analyzing video information to determine whether an action or occurrence is shown in the video, based on a given set of parameters, is referred to as a video analytics process. The parameters, as well as data collected and calculated by a video analytics process, are referred to as video analytics data. Video analytics processes are used to determine, for example, whether a particular event has occurred. In some implementations, video analytics processes are used to determine whether certain behavior or trends are present in the video. Video analytics processes are also optionally used to identify or track the movement of objects or items that are shown in the video.

Various store events are optionally monitored and analyzed using video analytics processes and the video monitoring system 100. For example, the system is configured to identify loitering or dwelling (e.g., stopping or substantially stopping at a particular location), traffic flow, past a particular location, whether a person has reached into a display or product location (e.g., crossing a video trip line), or whether a person has left an item behind, etc. Other video analytics processes are used to determine, for example, whether or when a shopper stops at a certain point of interest and how long the shopper stays at the particular location. Such video analytics processes also provide information about the timing of purchases, person behaviors, shopping patterns, and the like.

In certain implementations, the video monitoring devices 102 of the video monitoring system 100 are distributed so as to capture video of a substantial portion of the facility. In other implementations the devices 102 are localized to capture footage of primarily high-interest areas, such as secure areas, customer service counters, point-of-sale terminals, or potential theft threat locations (e.g., areas with relatively small, relatively valuable or poachable items such as flash memory, jewelry, and handheld electronics). The video monitoring devices 102 are optionally set up, for example, to capture video of areas with relatively high-turnover items, such as staple products and items that are often being restocked due to limited shelf space.

The video monitoring devices 102 are optionally positioned in a number of different ways. For example, the devices are mounted in the ceiling looking straight down at a location or looking down at an angle to a location. Alternatively, the devices are shelf- or rack-mounted and positioned to view across an aisle at a location. The devices 102 are optionally also positioned to be hidden from normal view, such as behind a one-way mirror, or integrated and hidden within a structure. The video monitoring devices 102 are optionally also set up in plain view, which can serve to alert would be thieves that they are being monitored.

Each of the video monitoring devices 102 is respectively directed at a certain location 110 within a particular facility, such as at a particular aisle or department, for example. Similarly, the devices are optionally directed at a particular object, such as, by way of example and not limitation, a point-of-sale terminal, a specific display, or a particular door. In some implementations, such as in stores with particularly high-priority areas, multiple monitoring devices 102 are optionally configured to capture different angles of the same area. In such implementations, two or more cameras are located in different areas, but are pointed toward the same area.

Each of the video monitoring devices 102 is communicatively coupled to a controller 104, such as a master video server. The controller 104 and video monitoring devices 102 are communicatively coupled via a network, such as a local area network (LAN), a wide area network (WAN), or the like. They are optionally also connected via a wired connection, such as via video cables, or are optionally wirelessly connected, such as with a Bluetooth connection or another suitable wireless protocol.

In certain implementations, the controller 104 provides an interface for a user, such as a security guard or other store personnel, to interact with any of the video monitoring devices 102. The controller 104 includes a video display. The video display provides a graphical user interface to allow a user to monitor and/or control the video cameras located throughout the facility. Controller 104 also includes a keyboard for inputting information into the controller 104, and/or a pointing device, such as a mouse, for controlling a cursor or other pointer displayed on the video display.

The controller 104 is optionally also communicably connected to a number of user devices, which are optionally assigned to store personnel and are either located at the facility or at a remote location. In the depicted example, the controller 104 is connected via a network, such as a LAN, to a local computer 114 that is used by security or other store personnel to enable control or monitoring of the video monitoring system 100, including the various video monitoring devices 102. As also depicted in this example, the controller 104 is communicably connected, such as via a wireless network or Bluetooth, to one or more handheld portable devices 118, which store personnel are able to use throughout the facility.

A central store computer 120, such as a rack-mounted computer server, is optionally communicably coupled to monitoring devices 102, the controller 104, and/or the user devices 114 and 118 via a network, optionally a local area network (LAN) or a wide area network (WAN). The central store computer 120 receives video data from the controller 104 and/or the monitoring devices 102 and performs video analytics processes with the video data. Information obtained through and/or conclusions drawn from the video analytics process are optionally communicated to the controller 104 and/or the user devices 114 and 118. Video analytics data, such as parameters used in video analytics processes and data collected and calculated from video data, is stored in a store database 122. Optionally, additional information, such as the location or user assignments of user devices 114 and 188, are also stored in the store database 122.

Each of the video monitoring devices 102 of the video monitoring system 100 has a field of view 103. In certain implementations, the field of view 103 is optionally controllable via the controller 104, or by one or more of the user devices 114 or 118. The video cameras optionally include pan-tilt-zoom functionality that permits a remote operator to rotate the cameras' field of view or to zoom in on a particular area.

Figure 2:
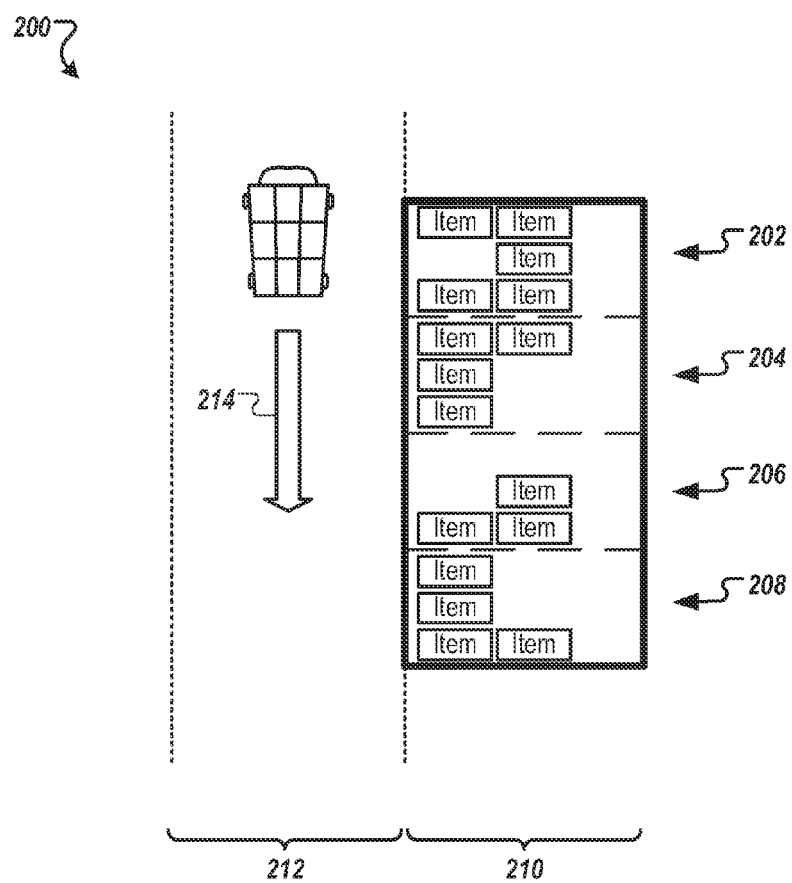
FIG. 2 is a representative overhead view of an aisle and shelf location of a retail store facility.

FIG. 2 shows a representative overhead view 200 of an aisle 212 and shelf location 210 of a retail store facility. The view 200 is representative of the field of view 103 of a video monitoring device 102 positioned in an overhead location, such as in a ceiling-mounted location. The shelf location 210 is optionally sectioned either physically (e.g., with shelf dividers) or logically (e.g., by type or brand of item) into a number of sub-locations, for example, several different brands of a product are stocked in a particular location, and more specifically in sub-locations 202, 204, 206, and 208 on a shelf location 210, which run adjacent to the aisle 212.

As will be described in greater detail below, algorithms stored in a computer system such as the controller 104, the local computer 114, and/or the central store computer 120 are programmed with instructions that, when executed on a processor, cause operations to be performed to implement video analytics processes. In various examples, video analytics processes are used to monitor a location and other locations, possibly having different configurations, located throughout the store. Different video analytics processes are used to analyze various events or behaviors occurring in the monitored locations.

For example, in one implementation, a video analytics process is used to monitor the movement of a person in a direction of travel (e.g., as indicated by arrow 214). If the movement is at a higher than normal pace (e.g., if comparison to surrounding people), and is accompanied by the removal of several items from sub-locations 202, 204, 206, and 208, the video analytics process optionally triggers an alarm (e.g., if the removal of items occurs within a predetermined time period). This example is representative of a person walking briskly down an aisle and sweeping large numbers of items into her cart as she goes. This particular type of behavior is optionally flagged as atypical.

In another example, a video analytics process is used to monitor the loitering of a person. If the person loiters near a shelf location 210 for a length of time, the system optionally triggers an alarm. In one implementation, if the person spends longer than a predetermined or dynamically determined time inspecting an item, this might be flagged as indicative of an inability by the person to choose between a plurality of items or of an interest in purchasing a product in a locked display case, in either case. It is possible to issue an alert to store personnel's handheld devices so that assistance is promptly provided.

In some implementations, the video analytics processes only trigger an alarm in the presence of two or more events or indicators. For example, video analytics processes are optionally configured to identify both loitering people and people reaching into a shelf location multiple times in a relatively short amount of time. If either of these events occurs without the presence of the other, then an alarm might not be appropriate. Similarly, if a person repeatedly and quickly reaches into a shelf location, an alarm is not to be triggered in certain implementations. If a person is loitering for a predetermined or dynamically determined amount of time and the person then repeatedly reaches into a shelf location in rapid succession, such activity is optionally presumed to be suspicious and an alarm is triggered (hereinafter it should be understood that references to predetermined times are intended to include dynamically determined times).

Alarms and alarm notifications take a number of different forms in various implementations. For example, one type of an alarm notification is transmitted or otherwise displayed on a monitor of the controller 104, which is viewable by store security personnel. In another example, an audible alarm either on the controller 104, a user device 114, 118, or storewide system, such as a security alarm, is generated. Other types of alarm notifications are also contemplated such as an alarm notification that is distributed to one or more of the user devices 114, 118, each of which is monitored by store personnel.

For example, if an alarm is triggered by suspicious activity in the sports department of a store, all of the user devices 114, 118 located in or around the sports department receive an alert. In some implementations, the alarm notification also describes (e.g., textually, graphically, aurally, visually, etc.) the reason the alarm was triggered. The alert also includes additional information, such as a still image or video clip of the activity that triggered the alarm and instructions as to how to respond to the alarm. In certain implementations, the still image of the suspicious activity also includes highlighting or other indicators specifically pointing out the activity that raised the alarm. For example, a red box is optionally drawn around an area of the image that led to the alarm, and the box is superimposed on the image to draw a viewer's attention to the appropriate portion of the image.

Similarly, alarm notifications are generated for transmittal to appropriate locations of the retail environment. For example, if an alarm is generated due to the occurrence of a certain number of reach-ins into a shelf location, an alarm notification is transmitted to a stock room, a stock room manager, a floor manager, security personnel, or combinations thereof. An alarm notification is communicated to the central store computer 120 that executes a security policy or rule set that causes the appropriate distribution of the alarm notification depending upon the type of the alarm or the location at which the alarm event occurred. Transmission and/or distribution of the alarm notifications are made, for example, via an e-mail notice, a printed notice, a pop-up notification on a point of sale screen, or an audible alarm.

In one implementation, an alarm notification is optionally distributed to specific user devices 114, 118 that are located closest to the video camera feed that resulted in the alarm being generated. The central store computer 120 optionally uses a transponder system to determine where a particular portable device 118 is located in the store. The central store computer 120 is optionally configured to maintain dynamic device location information in the store database 122 to ensure that the location of mobile and non-mobile user devices 114, 118, as well as each of the video monitoring devices, is kept up to date. For example, the central store computer 120 updates the store database 122 periodically, such as every two minutes, by querying the portable devices for their current location, and storing the most recent location of each device in the database 122. Similarly, the user devices 114, 118 are optionally configured to track of their own location relative to transponders within the facility and periodically send location information to the central store computer 120, for example, via a wireless network.

When an event occurs that triggers an alarm, the store database 122 is optionally queried to identify the location of the video monitoring device that captured the event, and also identifies, for example, the four user devices 114, 118 that are located in closest proximity to the event. Then, the central store computer 120 distributes the alarm notification information to each of those four user devices 114, 118.

In some implementations, multiple video analytics processes are configured to operate sequentially so that one video analytics process is used to trigger another video analytics process. For example, a video analytics process is used to first identify loitering in a particular area. If loitering is detected, then instead of or in addition to an alarm being generated a second video analytics process is triggered to begin analyzing that particular area or another area for related behavior such as rapid movement by the person who was previously loitering.

Figure 3:
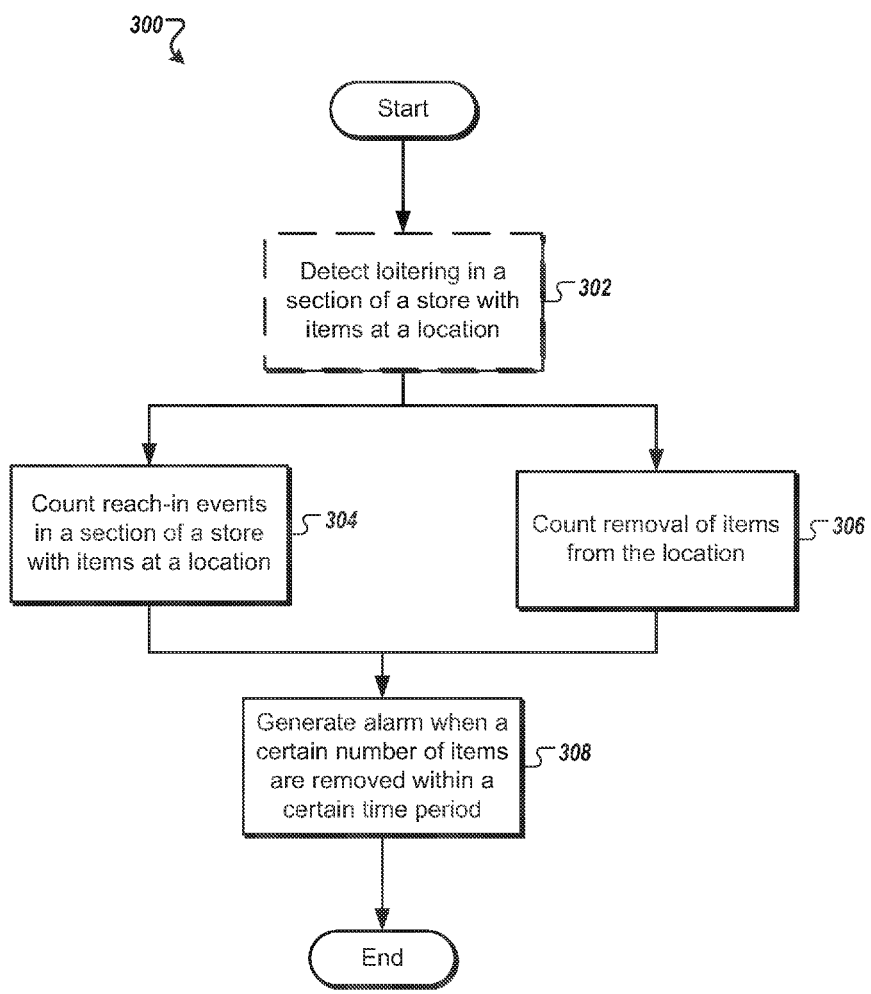
FIG. 3 is an example of a flowchart for detecting the removal of multiple items from a location.

FIG. 3 is an example of a flowchart for defecting the removal of multiple items from a location, as done, for example, with the video monitoring system 100. In the method 300, when a person removes more than a predetermined number of items from a single location, such as location 202, and the video monitoring system and video analytics process detect that the removals occurred within a certain amount of time, an alarm is optionally generated. The method 300 includes monitoring, with a video monitoring system, a section of a store with items at the location, optionally detecting (302) loitering in the section, counting (304) reach-in events in the section, counting (306) removals of items from the location, and generating (308) an alarm when a certain number of items are removed from the location within a certain time period.

For example, method 300 is optionally used for monitoring a particular location within a retail store that has relatively high priced items that are relatively small in size, and which are easy to conceal. Such items include, by way of example and not limitation, flash memory, fragrances, and diabetic test strips. A person intending to purchase the item and behaving normally typically removes a certain number of these items for a single purchase, such as two packs of razor blade refills. However, it is optionally classified as abnormal for a person to take twenty packs of razor blade refills at a given time, if the video analytics process detects such abnormal behavior, the system generates an alarm.

According to one implementation, the method 300 monitors for such abnormal behavior by using a number of different video analytics processes (302, 304, and/or 306) either in combination or separately. A first video analytics process is used to detect (302) loitering in the area, which triggers a timer to start counting how long the person has been loitering. A second video analytics process is used to determine (304) whether the person has crossed a trip line, which, in certain cases, is used as a proxy for evaluating whether the person has reached into a particular shelf location. Again, a single reach-in event optionally triggers a timer to begin, which is used to keep track of how many times in a predetermined amount of time the person has reached into the same shelf location. A third video analytics process is used to count (306) object removal by the person. Object removal video analytics processes are used to monitor how many items have been removed from a particular shelf location, such as by comparing the number of items that were in a given location prior to a reach-in event with the number of items remaining in the same location after the reach-in event. An alternative object removal video analytics process is configured to specifically track individual objects in a shelf location, and to identify when one or more of the items has been removed from the shelf location. Similarly to the other video analytics processes, a timer is used to track the time from a first item removal to subsequent removals.

These three video analytics processes (302, 304, and/or 305) can be combined as follows. When a loitering event is detected, a timer is optionally begun. If a single loitering individual removes a predetermined number of objects and/or reaches a predetermined number of times into the shelf location holding the objects within a predetermined period of time an alarm is triggered. The corresponding alarm notification indicates, for example, that multiple items were removed from a single location within a certain amount of time by a single individual, who was loitering in the location prior to removing the items.

While the above example relates to multiple removals of a particular item or reach-in events by a single person, theft rings sometimes use multiple persons to remove fewer items at a time. Over the course of a short period of time, a theft ring is capable of removing a significant number of items. To counter these tactics the video monitoring system 100 may count (304) reach-in events and/or count (308) removals of items is performed for groups of people within a time frame, instead of just one person. Multiple reach-in events or removals of items from a particular location by a predetermined number of multiple people over a predetermined time period triggers an alarm. The alarm indicates that multiple items have been removed from a single location within a certain amount of time by a group of individuals.

Figure 4:
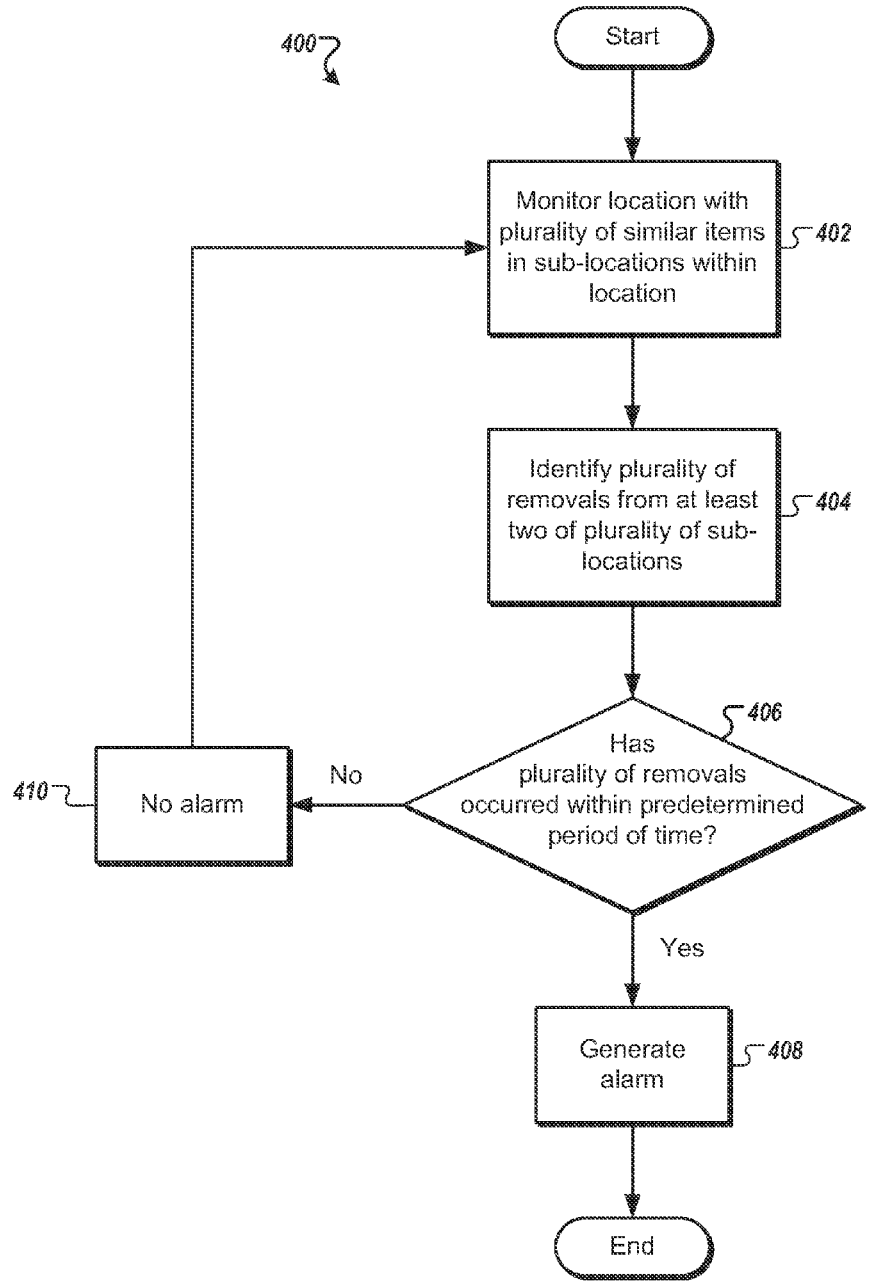
FIG. 4 is an example of a flowchart for detecting the removal of items from multiple locations.

FIG. 4 is an example of a flowchart for detecting the removal of items from multiple locations in a certain period of time. In the method 400, when a person removes items from each of a predetermined number of separate nearby locations, such as, for example, locations 202, 204, 206, and 208, and the removals all occur within a predetermined amount of time, an alarm is generated. In certain implementations, method 400 includes monitoring a plurality of closely spaced locations, each of the locations stocking similar products, for example, several different brands of fragrances or several different brands of flash memory cards. The method 400 is optionally used to monitor items that are relatively small and of relatively high value.

In this example, one or more video monitoring devices are used to monitor multiple locations. Multiple video analytics processes are used, either alone or in combination, to identify removals of items, from more than one of the multiple closely-spaced locations, within a certain predetermined period of time, by an individual moving through the location. The method 400 includes monitoring (402) a location, within, for example, a retail store having a plurality of similar items in a plurality of sub-locations in a closely-spaced configuration at the location, identifying (404) a plurality of removals of items from at least two of the plurality of sub-locations, determining (406) whether the plurality of removals occurred within a predetermined period of time, and generating (408) an alarm if the plurality of removals occurred within the predetermined period of time. If the plurality of removals of items from at least two of the plurality of sub-locations has not occurred within the predetermined period of time, no alarm is generated (410).

The video data from multiple different video monitoring devices 102 are optionally used to implement the method 400. For example, a single camera monitoring location 202 identifies a plurality of removals of items from sub-location 202 only, and another single camera monitoring location 204 identifies a plurality of removals of items from sub-location 204 only. These two events, when considered individually, do not rise to the level of suspicious behavior. When combined with each other within a predetermined amount of time, the two events are considered suspicious. An alarm is generated that describes the multiple removals from at least two sub-locations, occurring within the predetermined period of time. If the respective events were not raised within the predetermined period of time, an alarm is not generated.

While object removal over predetermined time periods by individuals or groups of individuals has been described with respect to small volume, higher priced objects or items, it should be understood that these methods apply equally to larger items or lower priced items as well. As such the methods described herein are amenable for use in a variety of different retail environments having a variety of different products and configurations.

Figure 5:
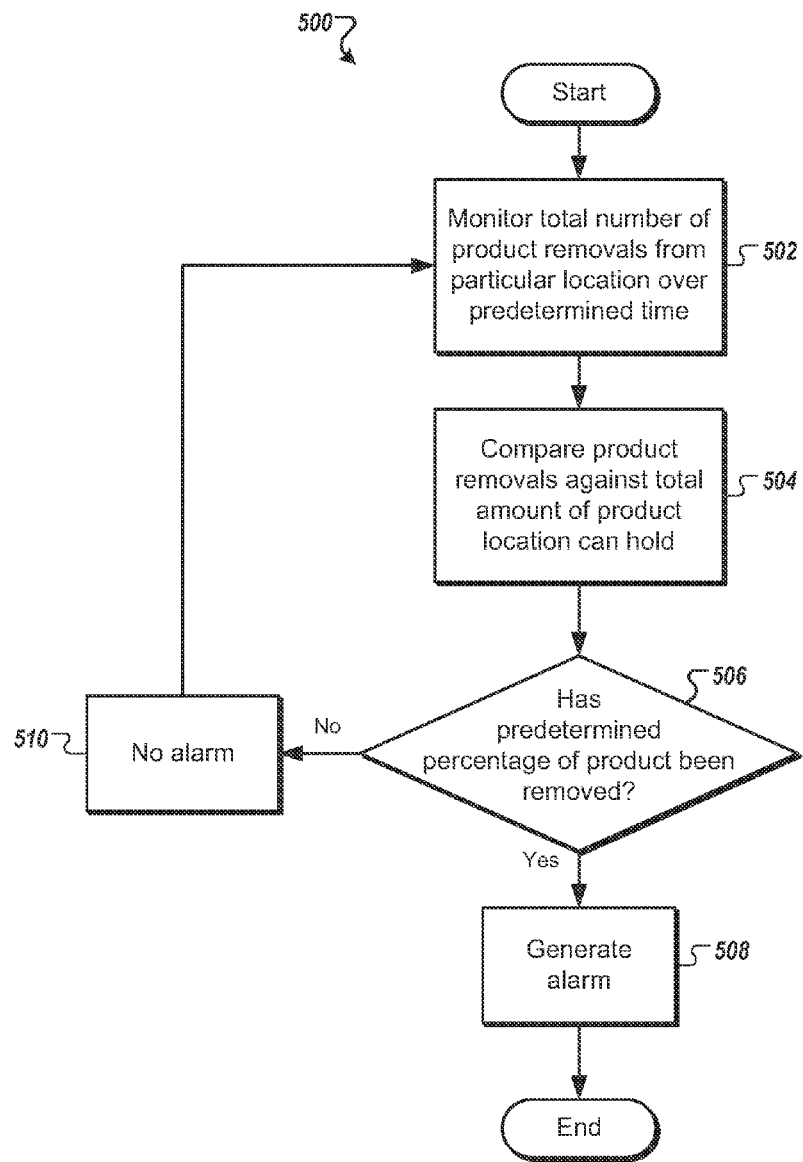
FIG. 5 is an example of a flowchart for detecting the stock level of items in a location.

FIG. 5 is a flowchart for a representative method 500 of detecting a stock level of items in a location. Such a method is used, for example, to determine when an Item or items at a particular location within a retail store is ready to be re-stocked. In some implementations, method 500 includes monitoring (502) a total number of product removals at a particular location over a particular time period. The total number of product removals is compared (504) to a total number of stocked products that the location typically holds, and such comparison indicates when a predetermined portion of the product has been removed from the location. If it is determined (506) that a predetermined portion of the product has been removed from the location, a restock alarm is generated (508). If a predetermined portion of product has not been removed within the predetermined time period, no alarm is generated (510).

The determination of the amount of product removed from the location is accomplished in a number of different ways. In one implementation, a removal is indicated any time a reach-in to the location is determined to have occurred. Such a reach-in event is optionally determined by setting a line, or trip point, in a video frame within the video feed for the area being monitored. This is optionally accomplished by receiving input, such as a mouse click on two points in a video frame. Video analytics data representing the trip point (e.g. coordinates in a video frame) are created and stored in the store database 122. When displayed, the trip point appears as a virtual line superimposed over video data. The trip point is monitored by the video analytics process, and when the trip point is crossed by a shopper, or a part of a shopper, a reach-in event is optionally determined to have occurred. Once a predetermined number of reach-ins has occurred, an alarm indicates that the product at that location is ready to be restocked. Reach-ins do not necessarily accurately count item removals. For example, it is possible that a person removes zero, one, or multiple items during each reach-in. An expected number of items removed is predetermined or calculated from historical data. The number of reach-ins is multiplied by the expected number of items removed to estimate the number of removed items. Based on the estimated number, an alarm is triggered that indicates restocking is appropriate.

While a total number of reach-ins to a location are counted and compared against the known number of items stocked in the shelf location to determine when it is likely that the item is ready to be restocked, other video analytics processes are optionally also used for a similar purpose. For example, in some implementations, video analytics processes are used to determine that a certain amount of shelf location is empty. In this example, a determination that a certain amount of shelf location is empty is optionally accomplished, for example, by using a differential video analytics process. A differential video analytics process is optionally used to compare differences from one frame to the next in a video stream, or from one frame to a non-sequential later frame in the video stream. The comparison is accomplished by isolating at least two images of an area being monitored, each of the images capturing the same location but at a different period of time, and determining if there are differences in the two images. A differential determination is made, for example, using video analytics processes that identify a difference in color, contrast, or the like between the two images.

In another variation, low stock of a product in a location is determined by identifying the aggregate size of objects removed from the shelf location, and comparing that identified aggregate size to the known overall available space in the shelf location. Once a predetermined portion or percentage of shelf location has been cleared of items (e.g., as determined by the size of the removed items multiplied by the number of removals) an alarm is generated to indicate that the product at that particular location is ready to be restocked.

A determination of the size of an object removed from the shelf location is optionally made by superimposing a virtual box, or other shape, predefined in the video analytics data, onto the video image from a video camera monitoring that shelf location. When an object matching the size of the items stocked at the shelf location is removed from the shelf location, a determination is made that a reach-in has resulted in an item removal. In such an implementation, reach-ins that do not result in item removal are ignored or weighted differently in the evaluation of whether the shelf location is ready to be restocked. The combination of a certain number of reach-ins with a certain level of object removal within a predetermined period of time also generates a security alarm.

In another implementation, a number of items stocked on a shelf location is optionally predetermined, such as by manually counting the number of items the shelf location holds when it is fully stocked. This number of items is optionally provided to or entered into the video analytics data for that particular shelf location. Video analytics processes are used to determine when a shelf location is ready to be restocked by comparing the number of reach-ins, or the number of reach-ins with object removal, with the total number of items stocked in the shelf location when it is fully stocked. If the number of items remaining in the shelf location falls below a defined value, or if the percentage of items remaining drops below a defined percentage, an alarm is generated to indicate that the shelf location is ready to be restocked. For example, when the number of reach-ins to the shelf location, or the number of reach-ins with object removal, reaches 75% of the total number of items in the shelf location when it is fully stocked, the alarm is generated.

After a number of removals has been determined and compared to a predetermined percentage or the total number of items possible in the particular location in the shelf location, an alarm is optionally generated, item removals are counted, for example, by the number of reach-ins to the item location, or by using a known size of the product stocked at the location for which item removals are being monitored. For example, a particular location that is being monitored by a video monitoring system has the capacity to hold 200 items. A size for each of those items is known or determined. Then, video analytics processes are used to determine a number of reach-ins into the particular location and the size of the object removed from the particular location. Every time a reach-in occurs and an object of the particular size is removed from the location, the video analytics process increments a counter that counts how many items have been removed from the particular location. Once a predetermined number, or a predetermined percentage, of the items have been removed, an alarm is generated to indicate that the stock level of the item is low. The predetermined number or percentage is optionally set for the particular monitored product and the level of stock that the store determines is acceptable.

In some implementations, a reference image of the particular location is captured by the video monitoring system, for example every second, and a comparison is made between successive captured images. When the difference between the captured images is sufficient to indicate that an item or items have been removed and a count is incremented based on the difference between the two images. Once the count has reached a predetermined number, an alarm is optionally triggered, indicating that the item at the particular location is ready for restocking.

As described above, the alarm notifications related to low stock levels take a number of different forms. For example, the alarm notifications are transmitted to a number of different computing devices, including the controller 104, and/or one or more user devices 114, 118. Low stock alarm notifications are sent to various store personnel, such as a stock room associate, a stock room manager, and/or a departmental associate in the department where the low-stock alarm is indicated via user devices 114, 118 assigned to those personnel.

For example, if an alarm was triggered by a low stock level in the linens department of a store, all of the user devices 114, 118 located in or around the linens department receive an alert, as does the stock room associate responsible for restocking the linens department. In some implementations, the alarm notification also describes (e.g., textually, graphically, aurally, visually, etc.) why the alarm was triggered. The alert also includes additional information, such as a still image of the low stock product location, information about the shelf location capacity available at the product location, the SKU (stock keeping unit) number of the low stock product, the product location, the item name, the item type, or the stock room location of the item.

The alarm notifications optionally include data related to the product and projected quantities needed to restock the shelf. Based on the techniques described herein the system 100 optionally determines an approximate number of units remaining on the shelf and an approximate number of units needed to restock the area. This determination is based on predetermined product stock area, product size, and the data concerning the approximate number of product removals.

Figure 6:
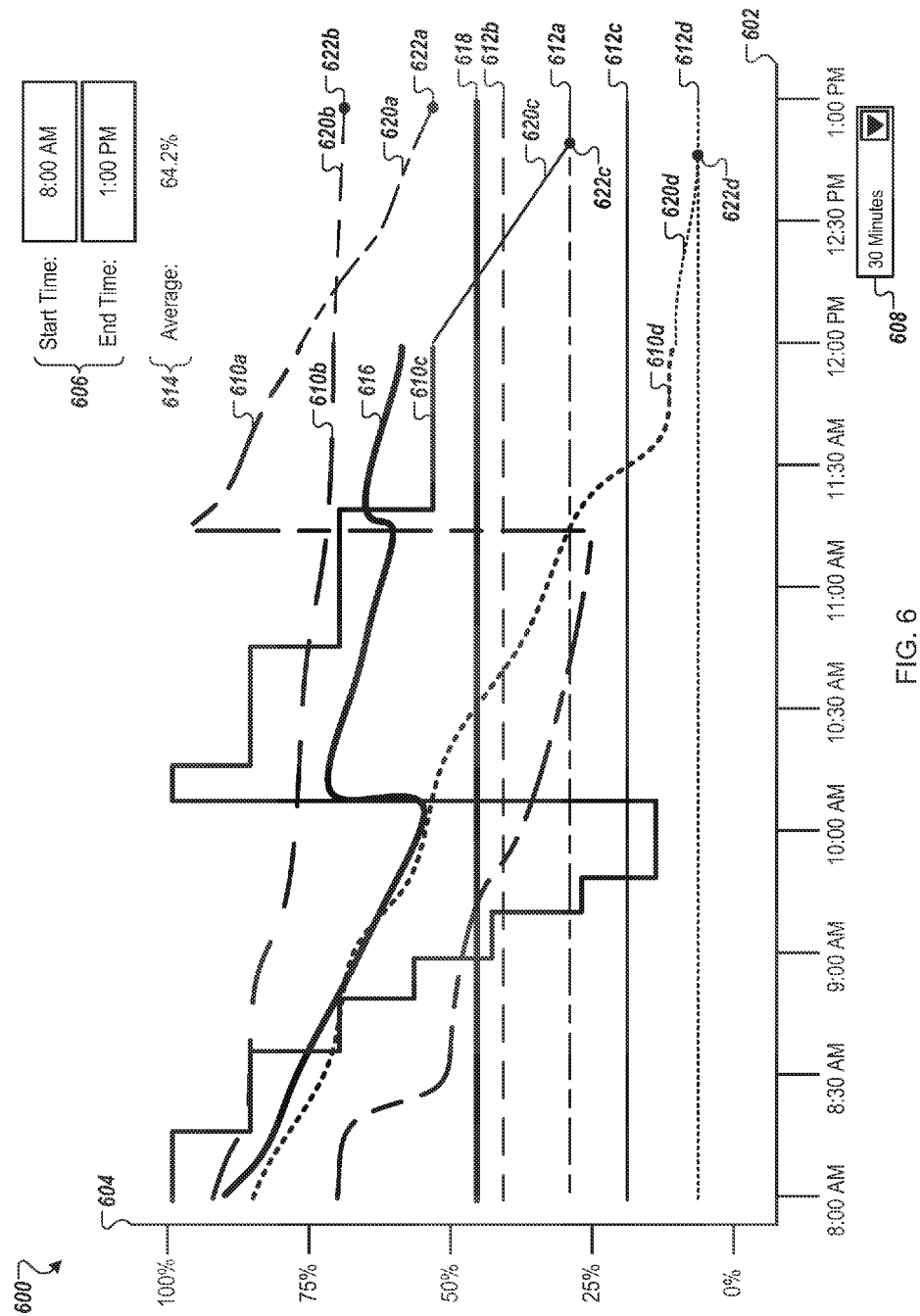
FIG. 6 is an example of a line chart for displaying the stock level of items monitored by a video monitoring system.

FIG. 6 is an example of a line chart 600 for displaying the stock level of items monitored by a video monitoring system. In one preferred implementation, the video monitoring system 100 utilizes color differentiation to identify vacant shelf area in a perishable goods department of a retail environment. The system includes a plurality (preferably one, two, or three) of pan/tilt/zoom cameras to acquire one still image per minute of various produce contained in upwardly facing shelving units. The camera successively zooms in on discrete shelving bins that contain discrete types of perishable goods and takes at least one still image of each bin. The system 100 analyses each image and differentiates between open shelf space and product through color differentiation image processing and/or other techniques described herein. Upon analysis of each image, the system 100 actively and in real time updates store database 122 with the latest item count and a percentage-in-stock metric. When the percentage-in-stock falls below a predetermined threshold that is set by a user for each product or product type (e.g. the threshold for fruits is 45%, whereas for prepackaged lettuce the threshold is set at 25%), a notification is generated as described elsewhere herein. Customizing thresholds permits the user to increase the likelihood that customers will actually pick an item off the shelving units for purchase by mitigating the potential negative impact of a low stock condition. For example, some customers are disinclined to purchase perishable goods if the display appears to be "picked over" which, in turn, creates an impression that the better or higher quality produce has already been purchased.

The in-stock status of various products is optionally reported via a user interface in graphical form such as the line graph 600 with time on the X axis 602 and merchandise stock levels in the Y axis 604. The line graph 600 is adjustable based on user input specifying a start time and/or an end time 606. Users also specify desired time increments 608 (e.g. three, five, ten, or thirty minute increments) for the X axis display. The line graph includes a stock level line 610 and a horizontal line 612 or other visual indictor of the predetermined threshold for the displayed product or product category. The graph optionally also indicates an overall average 614 of the stock level for a given time period for a given product or category/type of product.

In further implementations, multiple product stock level lines 610a-610d are displayed on the same line graph 600, such as for different products in the same display. For each product (e.g. carrots, onions, celery, and tomatoes), a color coded or hashed bar or line 610a-610d (e.g. orange, yellow, green, and red, respectively) shows the current stock level of that product and a similarly colored or hashed horizontal line 612a-612d shows the predetermined threshold for that product. An average in stock line 616 (e.g. black and bolder than the other lines), shows the average stock level of all products in the graph. For example, a carrot section 90% full, an onion section 85% full, a celery section 80% full, and a tomato section 75% full will be shown with an average stock level of 82.5%. In some examples, the averaging function weighs the products differently. An average threshold line 618 indicates a minimum average threshold for the products shown. When the average stock level of all products falls below a predetermined threshold, even if that threshold is higher than any individual product threshold, an alarm is generated, as described elsewhere herein, with instructions to restock the entire display. For example, each individual product has a threshold between 45% and 12.5%, but if the average stock level fails below 60%, all of the products are restocked to avoid a situation in which multiple products fail below their individual threshold values in a short amount of time.

In some of these implementations, the trends of stock level lines 610a-610d are predicted and displayed as trend lines 620a-620d for future time. The trend lines 620a-620d are created by finding a best fit curve for each line from a plurality of two variable functions. At user selected regular intervals, or upon user initiation, the trend lines 620a-620d are calculated and displayed until the trend lines 620a-620d intersect 622a-622d their associated threshold line 613a-612d or an ending time such as an hour, the end of the day, or the end of a work shift. The predicted intersection 622a-622d events correspond with the expected occurrence of an out-of-stock condition. The predicted intersection events are optionally listed and sorted according to the predicted time of their occurrence. The list is formatted to display product name, product location, and a restocking deadline corresponding to the predicted intersection point. This list is distributed as an alarm, using techniques described elsewhere herein, and used as a to-do list which categorizes restocking tasks in order of importance.

Figure 7:
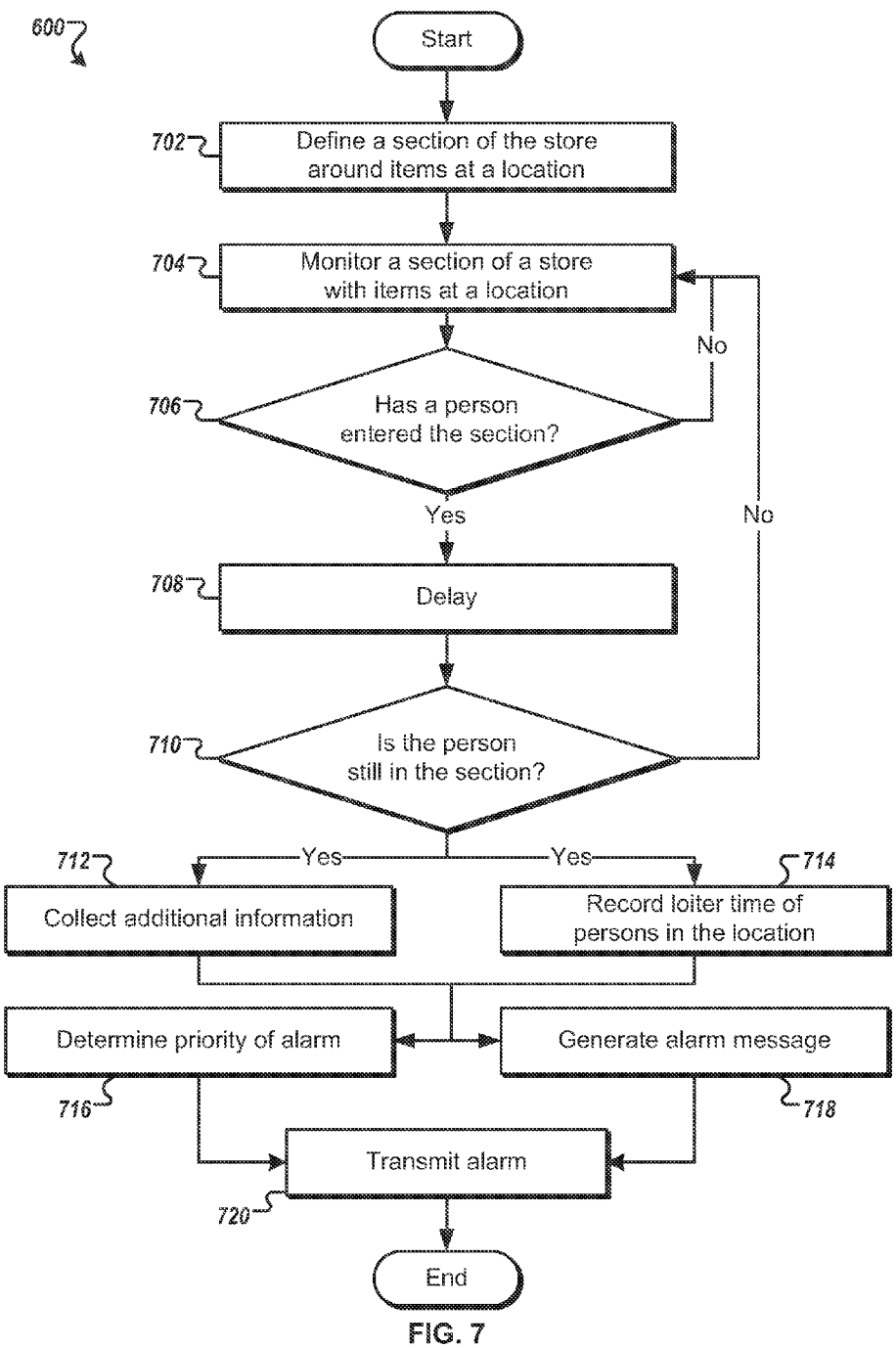
FIG. 7 is an example of a flowchart for detecting the loitering of a person in a single location.

FIG. 7 is a flowchart for detecting the loitering of a person in a single location, as is optionally done with the video monitoring system 100. In the method 700, when a person enterers an area, such as the aisle 212, the video monitoring system 100 begins to record the person's time loitering in that area. In some implementations, the method 700 includes defining (702), with a video monitoring system 100, a section of a store around one or more items. The section of the store is monitored (704) to note when a person has entered the section (706). After a delay (708), if the person is still in the section (710), the loiter time of the person is recorded (714) and additional information is collected (712). An alarm message is generated (718) and a priority is determined (716) for the alarm. The alarm is transmitted (720) through one or more channels, optionally dependent upon the priority of the alarm.

In one embodiment, a section of a store around items is defined based on the field of view of a camera that is recording video data of the items. For example, the entire field of view of the camera defines the section, or a series of connecting trip lines within the field of view of the camera defines the section.

When a person enters the section, a timestamp is recorded, a delay timer is started, or another method of starting a delay is undertaken. After a period of time, such as a later time reading or when the delay timer reaches zero, a determination is made as to if the person is still in the section. This delay is the minimum loiter time to generate a loiter alarm in the section. The delay time varies depending on the type of items the section is near. A section near a complex array of items such as breakfast cereal has a longer delay time, for instance five minutes, than the delay time near a less complex array, for example three minutes. In this example, an interested person is expected to pick from many choices and read multiple nutrition labels before being ready for assistance with a selection. A section near simple product arrays or near high profit margin items is assigned a shorter delay period, such as two minutes. In the case of simple item arrays, such as tape and glue, a person is expected to make a decision relatively quickly if they are not confused by the items or product presentation. In the case of a high profit margin item, the delay time is optionally set to a shorter period in order to decrease the likelihood of a lost sale due to frustration or confusion.

When a person is discovered to have loitered for the minimum loiter time, additional information is collected. In one embodiment, video analytics processes are used to detect predetermined suspicious behaviors in the section surrounding a jewelry display. In such situations, store employees are alerted to the situation and instructed to approach the person, which, in turn, potentially reduces the incidence of theft, in yet another implementation, video analytics processes are employed to determine if a loitering person is picking up and replacing multiple items, which potentially indicates that the person is deciding between items to purchase. Additional information is collected including traffic flow in the section, inventory or profit margin levels of items in the section, and a count of the number of people in the section.

The alarm message is generated based on the loitering person and/or the additional information gathered. The contents of the alarm are partially dependent on the additional information collected. A person exhibiting suspicious behavior near high value items leads to the generation of an alarm that includes a picture of the person as they loiter. A person that is loitering near a locked display generates an alarm with a note that a key to the display will be required. The alarm message includes audio, video, image, and text, depending on the type of alarm, the information gathered, and the distribution channels in which the alarm is distributed.

The priority of the alarm is determined based, at least in part, on the additional information collected. A person loitering near high profit margin items generates a high customer service priority alarm. A person displaying suspicious behavior near high price items generates an alarm with a medium customer service priority, a high security priority, and instructions to greet but not confront the person. A person examining heavy, hut low volume, merchandise such as furniture generates a low priority stock assist alarm and indicates an employee should retrieve a dolly or cart before going to the section where the person is loitering.

The alarm is transmitted depending, at least in part, on the priority of the alarm. A low priority alarm in a particular department is optionally sent to the handheld device assigned to a subset of employees assigned to work in that department. A high priority alarm is sent to the handheld device of all employees in the department, as well as any employees nearby. A stock assist priority alarm is, in some embodiments, sent only to employees that assist with heavy or bulky stock. Security priority alarms are sent to the workstation terminal of security personnel, and if the alarm is also high priority, to the public address system and/or handheld device of nearby employees. Additional types and values of priorities are possible and are transmitted through these or additional channels.

Figure 8:
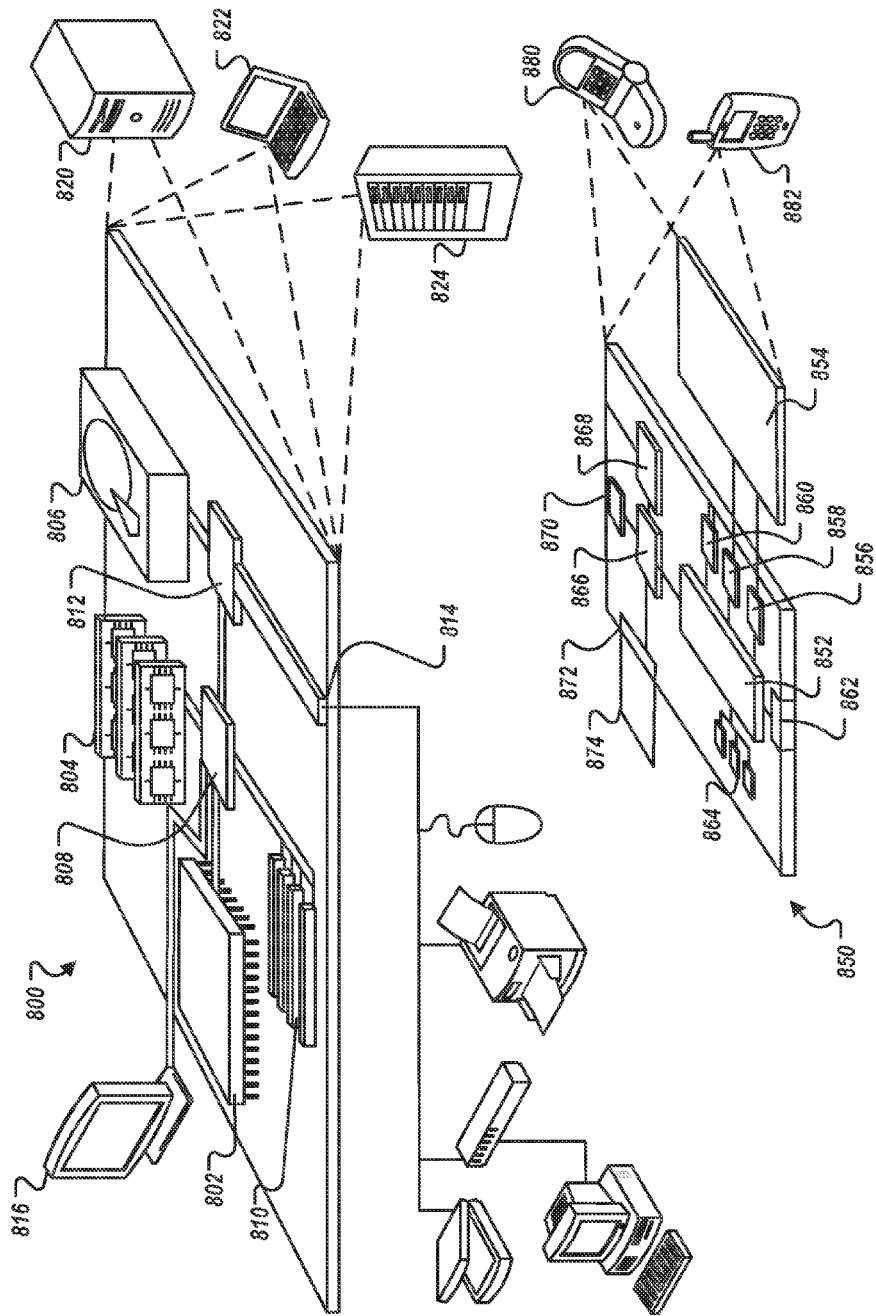
FIG. 8 is a schematic diagram showing examples of a computing device and a mobile computing device.

FIG. 8 shows an example of a computing device 800 and a mobile computing device used to implement the techniques described here. The computing device 800 is intended to represent various forms of digital computers, such as laptops, desktops, workstations, personal digital assistants servers, blade servers, mainframes, and other appropriate computers. The mobile computing device is intended to represent various forms of mobile devices, such as personal digital assistants, cellular telephones, smart-phones, and other similar computing devices. The components shown here, their connections and relationship's, and their functions, are meant to be exemplary only, and are not meant to limit implementations described and/or claimed herein.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and are optionally mounted on a common motherboard or in other manners as appropriate. The processor 802 processes instructions for execution within the computing device 800, including instructions stored in the memory 804 or on the storage device 806 to display graphical information for a GUI on an external input/output device, such as a display 816 coupled to the high-speed interface 808. In other implementations, multiple-processors and/or multiple buses are optionally used, as appropriate, along with multiple memories and types of memory. Also, multiple computing devices are optionally connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 is optionally also another form of computer-readable medium, such as a magnetic or optical disk.

The storage device 806 is capable of providing mass storage for the computing device 800. In some implementations, the storage device 806 is or contains a computer-readable medium, such as a floppy disk device, a hard disk device, an optical disk device, or a tape device, a flash memory or other similar solid state memory device, or an array of devices, including devices in a storage area network or other configurations. A computer program product is tangibly embodied in an information carrier. The computer program product also contains instructions that, when executed, perform one or more methods, such as those described above. The computer program product is tangibly embodied in a computer or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which optionally accept various expansion cards (not shown). In the implementation, the low-speed interface 812 is coupled to the storage device 806 and the low-speed expansion port 814. The low-speed expansion port 814, which includes various communication ports (e.g., USB, Bluetooth, Ethernet, wireless Ethernet) are optionally coupled to one or more input/output devices, such as a keyboard, a pointing device, a scanner, or a networking device such as a switch or router, e.g., through a network adaptor.

The computing device 800 is optionally implemented in a number of different forms, as shown in FIG. 8. For example, it is optionally implemented as a standard server 820, or multiple times in a group of such servers. In addition, it is optionally implemented in a personal computer such as a laptop computer 822. It is optionally also implemented as part of a rack server system 824. Alternatively, components from the computing device 800 is optionally combined with other components in a mobile device (not shown), such as a mobile computing device 850. Each of such devices optionally contain one or more of the computing device 800 and the mobile computing device 850, and an entire system is optionally made up of multiple computing devices communicating with each other.

The mobile computing device 850 includes a processor 852, a memory 864, an input/output device such as a display 854, a communication interface 866, and a transceiver 868, among other components. The mobile computing device 850 is optionally also provided with a storage device, such as a micro-drive or other device, to provide additional storage.

Each of the processor 852, the memory 864, the display 854, the communication interface 866, and the transceiver 868, are interconnected using various buses, and several of the components are optionally mounted on a common motherboard or in other manners as appropriate.

The processor 852 executes instructions within the mobile computing device 850, including instructions stored in the memory 864. The processor 852 is optionally implemented as a chipset of chips that include separate and multiple analog and digital processors. The processor 852 optionally provides, for example, for coordination of the other components of the mobile computing device 850, such as control of user interfaces, applications run by the mobile computing device 850, and wireless communication by the mobile computing device 850.

The processor 852 optionally communicates with a user through a control interface 858 and a display interface 856 coupled to the display 854. The display 854 is optionally, for example, a TFT (Thin-Film-Transistor Liquid Crystal Display) display or an OLED (Organic Light Emitting Diode) display, or other appropriate display technology. The display interface 856 optionally comprises appropriate circuitry for driving the display 854 to present graphical and other information to a user. The control interface 858 optionally receives commands from a user and converts them for submission to the processor 852. In addition, an external interface 862 optionally provides communication with the processor 852, so as to enable near area communication of the mobile computing device 850 with other devices. The external interface 862 optionally provides, for example, for wired communication in some implementations, or for wireless communication in other implementations, and multiple interfaces are optionally also used.

The memory 864 stores information within the mobile computing device 850. The memory 864 is implemented as one or more of a computer-readable medium or media, a volatile memory unit or units, or a non-volatile memory unit or units. An expansion memory 874 is optionally also provided and connected to the mobile computing device 850 through an expansion interface 872, which optionally includes, for example, a SIMM (Single In Line Memory Module) card interface. The expansion memory 874 optionally provides extra storage space for the mobile computing device 850, or optionally also stores applications or other information for the mobile computing device 850. Specifically, the expansion memory 874 includes instructions to carry out or supplement the processes described above, and optionally includes secure information also. Thus, for example, the expansion memory 874 is optionally provided as a security module for the mobile computing device 850, and is optionally programmed with instructions that permit secure use of the mobile computing device 850, in addition, secure applications are optionally provided via the SIMM cards, along with additional information, such as placing identifying information on the SIMM card in a non-hackable manner.

The memory optionally includes, for example, flash memory and/or NVRAM memory (non-volatile random access memory), as discussed below. In some implementations, a computer program product is tangibly embodied in a data storage medium. The computer program product contains instructions that, when executed, perform one or more methods, such as those described above. The computer program product is a computer or machine-readable medium, such as the memory 864, the expansion memory 874, or memory on the processor 852. In some implementations, the computer program product is received, for example, over the transceiver 868 or the external interface 862 and stored as a computer or machine-readable medium.

The mobile computing device 850 optionally communicates wirelessly through the communication interface 866, which optionally includes digital signal processing circuitry where necessary. The communication interface 866 provides for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), FDC (Personal Digital Cellular), VVCDMA (Wideband Code Division Multiple Access), CDMA2000, or GPRS (General Packet Radio Service), among others. Such communication occurs, for example, through the transceiver 868 using a radio-frequency. In addition, short-range communication occurs, such as using a Bluetooth, WiFi, or other such transceiver (not shown), in addition, a GPS (Global Positioning System) receiver module 870 optionally provides additional navigation- and location-related wireless data to the mobile computing device 850, which is optionally used as appropriate by applications running on the mobile computing device 850.

The mobile computing device 850 optionally also communicates audibly using an audio codec 860, which receives spoken information from a user and convert it to usable digital information. The audio codec 860 likewise generates audible sound for a user, such as through a speaker, e.g., in a handset of the mobile computing device 850. Such sound optionally includes sound from voice telephone calls, including recorded sound (e.g., voice messages, music files, etc.) and sound generated by applications operating on the mobile computing device 850.

The mobile computing device 850 is optionally implemented in a number of different forms, as shown in the figure. For example, it is optionally implemented as a cellular telephone 880. It is optionally also implemented as part of a smart-phone 882, personal digital assistant, or other similar mobile device.

Various implementations of the systems and techniques described here are realised in digital electronic circuitry, integrated circuitry, specially designed ASICs (application specific integrated circuits), computer hardware, firmware, software, and/or combinations thereof. These various implementations include implementation in one or more computer programs that are executable and/or interpretable on a programmable system including at least one programmable processor, which are optionally special or general purpose, coupled to receive data and instructions from, and to transmit data and instructions to, a storage system, at least one input device, and at least one output device.

These computer programs (also known as programs, software, software applications or code) include machine instructions for a programmable processor, and are implemented in a high-level procedural and/or object-oriented programming language, and/or its assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here are implemented on a computer having a display device (e.g., a CRT (cathode ray tube) or LCD (liquid crystal display) monitor) for displaying information to the user and a keyboard and a pointing device (e.g., a mouse or a trackball) by which the user provides input to the computer. Other kinds of devices are used to provide for interaction with a user as well; for example, feedback provided to the user is any form of sensory feedback (e.g., visual feedback, auditory feedback, or tactile feedback); and input from the user is received in any form, including acoustic, speech, or tactile input.

The systems and techniques described here are implemented in a computing system that includes a back end component (e.g., as a data server), or that includes a middleware component (e.g., an application server), or that includes a front end component (e.g., a client computer having a graphical user interface or a Web browser through which a user interacts with an implementation of the systems and techniques described here), or any combination of such back end, middleware, or front end components. The components of the system are interconnected by any form or medium of digital data communication (e.g., a communication network). Examples of communication networks include a local area network (LAN), a wide area network (WAN), and the Internet.

The computing system includes clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible, in addition, the logic flows depicted in the figures do not require the particular order shown, or sequential order, to achieve desirable results. In addition, other steps are possible, or steps are optionally eliminated, from the described flows, and other components are optionally added to, or removed from, the described systems. Accordingly, other implementations are within the scope of the following claims.

A number of implementations have been described. Nevertheless, it will be understood that various modifications are possible without departing from the spirit and scope of the systems and methods described herein. For example, the steps of various procedures are described as occurring in a certain order, hut many of the steps occur either simultaneously or in a different order than described. Accordingly, other implementations are within the scope of the following claims.

What is claimed is:

1. A method for monitoring and reporting an actual in-stock value of an item at a location of a retail facility, comprising:
   receiving video of a product location in a retail facility, the video being captured by a video monitoring device with a field of view that includes the product location;
   detecting an item removal event by analyzing, with a computing device, the video of the product location, the item removal event being detected when an item has been removed from the product location;
   in response to detection of the item removal event, adjusting, with a computing device, the actual in-stock value of the item located in the product location;
   tracking the actual in-stock value, with a computing device, to determine whether the actual in-stock value meets a first user selected threshold in-stock value that is greater than zero;
   in response to the actual in-stock value meeting the first user selected threshold in-stock value, generating with a computing device a real-time graphical report for the item, the report indicating the actual in-stock value over a user selected period of time for the item, the report further indicating a second user selected threshold in-stock value associated with a minimum in-stock value for the item; and
   generating an alert, with a computing device, when the actual in-stock value meets the second user selected threshold in-stock value.

2. The method of claim 1, wherein the actual in-stock value is tracked over a selected period of time and the computing device generates an average in-stock value.

3. The method of claim 1, wherein the graphical report includes in-stock values for each of a plurality of items.

4. The method of claim 3, wherein a different second user selected threshold is selected for each of the plurality of items.

5. A video analytic process for monitoring and graphically reporting stock levels at a retail facility, comprising:
   capturing by a video monitoring device a plurality of products at a product location at a retail facility;
   analyzing, using a computer, product removals from the product location captured by the video monitoring device;
   reporting via a user interface in a graphical form stock levels at the product location based on the analysis of product removals captured by the video monitoring device;
   wherein the graphical form is a line graph having an X axis representing elapsed time and a Y axis representing stock levels; and
   displaying a stock level line on the line graph.

6. The video analytic process as set forth in claim 5, further comprising the step of:
   displaying a predetermined minimum stock level threshold indicator line on the line graph indicating a minimum stock level threshold greater than zero.

7. The video analytic process as set forth in claim 6, further comprising the step of:
   automatically providing a restocking alarm when the stock level line intersects the minimum stock level threshold indicator line.

8. The video analytic process as set forth in claim 6, wherein the plurality of products includes products having a different product shape and the line graph includes a stock level line for each product of different product shape.

9. The video analytic process as set forth in claim 8, wherein each stock level line for each product of a different product shape is a different color.

10. The video analytic process as set forth in claim 9, wherein the line graph includes a predetermined minimum stock level threshold indicator line having a color corresponding to the color of the stock level line for each product of a different product shape.

11. A stock level status video monitoring apparatus comprising:
   a video monitoring device for recording removal of stock items from a shelf in a retail facility;
   a computer system connected to said video monitoring device;
   said computer system having an analytic capability for automatically determining when one of said stock items is removed from said shelf by automatically analyzing video recorded by said video monitoring device;

a display device configured to graphically display stock levels based upon the determination by said computer system that stock items have been removed from said shelf; and said display device being further configured to graphically display a predetermined minimum stock level.

12. The apparatus of claim 11, further comprising:

an alarm system for generating an alarm when said stock level reaches the minimum stock level.

13. The apparatus of claim 11, wherein:

the video monitoring device has a field of view which encompasses a plurality of different stock items and said computer system can determine stock levels for each of said different stock items.

14. The apparatus of claim 13, wherein:

said display device graphically displays a separate stock level for each of said different stock items.

15. The apparatus of claim 14, wherein:

said display device graphically displays each of said separate stock levels as a different color for each of said different stock items.

16. The apparatus of claim 15, wherein:

said display device graphically displays a predetermined minimum threshold stock level for each of said different stock item.

17. The apparatus of claim 16, wherein the apparatus further includes an alarm system for generating a low stock alarm notification when said stock level falls below said predetermined minimum threshold stock level.

18. The apparatus of claim 17, wherein the low stock alarm notification is sent to a plurality of computing devices.

19. The apparatus of claim 18, wherein the plurality of computing devices include a user device carried by store personnel.

20. The apparatus of claim 17, wherein the alarm notification provides information describing the stock item and its location.

* * * * *